United States Patent
Kombowski et al.

(10) Patent No.: US 8,936,142 B2
(45) Date of Patent: Jan. 20, 2015

(54) TORQUE TRANSMISSION DEVICE

(75) Inventors: Eugen Kombowski, Buehl (DE); Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 499 days.

(21) Appl. No.: 13/160,812

(22) Filed: Jun. 15, 2011

(65) Prior Publication Data
US 2011/0308908 A1    Dec. 22, 2011

(30) Foreign Application Priority Data
Jun. 17, 2010 (DE) .................. 10 2010 024 145

(51) Int. Cl.
*F16D 35/00* (2006.01)
*F16F 15/121* (2006.01)
*F16H 45/02* (2006.01)

(52) U.S. Cl.
CPC ........ *F16H 45/02* (2013.01); *F16H 2045/0247* (2013.01)
USPC ........................................ 192/3.29; 464/68.1

(58) Field of Classification Search
USPC ................. 192/3.28–3.3, 55.61; 464/68.1
See application file for complete search history.

(56) References Cited

U.S. PATENT DOCUMENTS

| | | | | |
|---|---|---|---|---|
| 4,422,535 A * | 12/1983 | Ling | | 192/3.28 |
| 5,025,904 A * | 6/1991 | Graton et al. | | 192/201 |
| 5,975,261 A * | 11/1999 | Woerner et al. | | 192/3.29 |
| 6,102,806 A * | 8/2000 | Nomura | | 464/68.1 |
| 6,179,106 B1 * | 1/2001 | Masuda | | 192/3.29 |
| 6,241,614 B1 * | 6/2001 | Mizukami et al. | | 464/68.4 |
| 7,662,043 B2 * | 2/2010 | Schmid et al. | | 464/99 |
| 8,066,574 B2 * | 11/2011 | Hada et al. | | 464/64.1 |
| 8,479,901 B2 * | 7/2013 | Engelmann et al. | | 192/3.28 |
| 2007/0068759 A1 * | 3/2007 | Koppitz et al. | | 192/3.3 |
| 2008/0229570 A1 | 9/2008 | Koppitz et al. | | |
| 2011/0226576 A1 * | 9/2011 | Feldhaus et al. | | 192/3.28 |

FOREIGN PATENT DOCUMENTS

DE   102005006253   8/2006

\* cited by examiner

*Primary Examiner* — David D Le
*Assistant Examiner* — Stacey Fluhart
(74) *Attorney, Agent, or Firm* — Simpson & Simpson, PLLC

(57) ABSTRACT

A torque transmission device, comprising a hydrodynamic component, a shiftable clutch device and a vibration damper. A turbine shell of the hydrodynamic component is connected with a damper input component of the vibration damper and/or with a turbine shell hub, which is at least indirectly supported in axial direction at a damper hub through a torque-proof connection. At least one axial support surface is provided at a face of a damper component, adjacent to the torque-proof connection in an axial direction, or of the damper hub. The face is oriented away in axial direction from the torque-proof connection. The invention is characterized in that a support element is arranged at the damper component or at the damper hub. The support element includes a support surface forming an axial protrusion, extending through adjacently arranged damper components or portions of a support.

7 Claims, 4 Drawing Sheets

Fig. 1

Prior. Art

TORQUE TRANSMISSION DEVICE

CROSS-REFERENCE TO RELATED APPLICATIONS

This application claims priority from German Patent Application No. 10 2010 024 145.8 filed on Jun. 17, 2010 which application is incorporated herein by reference.

FIELD OF THE INVENTION

The invention relates to a torque transmission device including a hydrodynamic component, a shiftable clutch device and a vibration absorber. A turbine shell of the hydrodynamic component is connected torque-proof with a damper input component of the vibration damper and/or a turbine shell supported at least indirectly in axial direction at a damper hub, and at least one axial support surface, in particular for receiving a support force is provided at a face of a damper component adjacent in axial direction to the torque-proof connection or the damper hub. The face is oriented away in axial direction from the torque-proof connection.

An axial support surface at the damper hub or at a damper component is a functional surface oriented in axial direction through which a support force is introducible into the damper hub or the damper component at least in a temporary manner. The support surface is in particular a contact surface for a tool for supporting the damper hub or the damper component when generating a torque-proof connection of the turbine shell with a damper input component and/or a turbine shell hub, in particular while configuring a torque-proof connection configured as a permanent connection in the form of a hot rivet joint or a welded rivet joint.

BACKGROUND OF THE INVENTION

Welded rivet joints are known e.g. from the printed document DE 10 2005 006 253. They are used for connecting a component with a base component through a bolt inserted into a borehole in the component. The bolt is initially electrically welded onto a face on the surface of the base component and plastically deformed subsequently. Thus, in particular the head of the bolt is heated in the same process step and upset simultaneously. This imparts a force towards the base component which has to be supported by an opposite force in order to form the connection.

A torque transmission device including a shiftable clutch device, a hydrodynamic component and a vibration absorber in which a turbine shell of the hydrodynamic component is connected torque-proof with a damper input component forming a hot rivet or welded rivet connection is described in an exemplary manner e.g. in the printed document DE 10 2006 028 771 A1. The connection is furthermore provided through a turbine shell hub supported at a damper hub.

When the configuration of a torque-proof connection between the damper component and the turbine shell is generally provided through a hot or weld rivet method, the connection is provided through melting and plastic deformation. The arrangement of the torque-proof connection is thus provided in the radial arrangement portion of the damper hub. Therefore the force required for producing the torque-proof connection has to be reacted at the damper hub. The support of the damper hub thus required is therefore provided through adjacent components, in particular damper components or components of the supporting tools. Thus, these include a plurality of particular bolts which become effective by reaching through respective pass through openings in components adjacent to the damper hub at the face of the damper hub oriented away from the torque-proof connection. The openings in the adjacent components required for this purpose are relatively large due to the large support surface at the tool. Furthermore for a permissible relative movement between the damper hub and the adjacent component the required rotation angle has to be provided accordingly through pass through openings extending over a portion of the respective component in circumferential direction. The pass through openings are relatively large and weaken the respective components which is of particular significance when the components have a torque transfer function.

Figure 1:
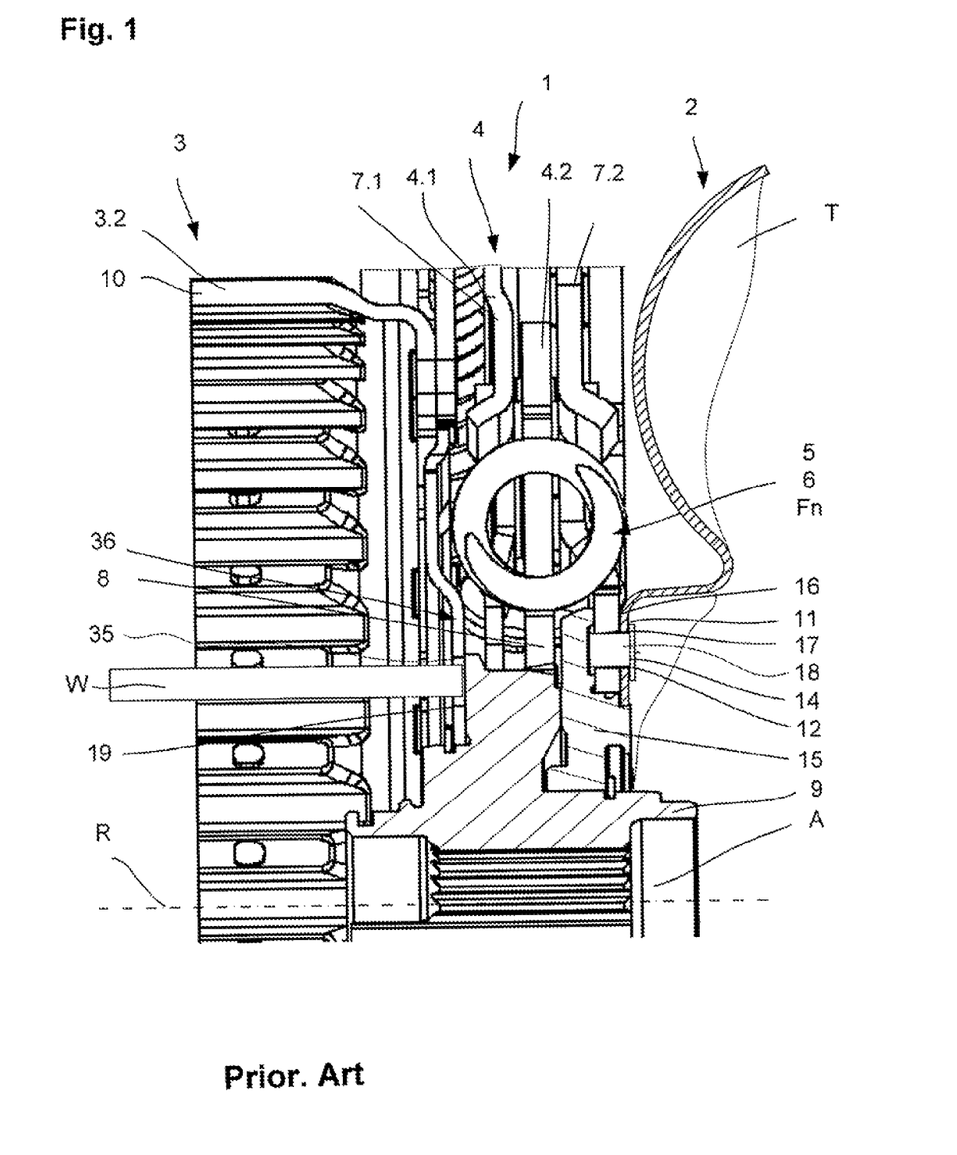
FIG. 1 illustrates the problems for a required support with reference to a detail of an axial sectional view of a prior art torque transmission device.

FIG. 1 illustrates the problems for a required support with reference to a detail of an axial sectional view of a prior art torque transmission device 1 when providing a torque-proof connection configured as a non-disengageable form locked weld rivet connection. The torque transmission device 1 includes at least one input which is not illustrated and configured to be coupled with a drive side component and at least one output that is configured to be coupled with an output side component. The output is formed by a transmission input shaft which is not illustrated in detail. Between the input and the output a hydrodynamic component 2 is arranged which is preferably a hydrodynamic speed-/torque converter. The torque transmission device 1 furthermore includes a shiftable clutch device 3 which is used for at least partially circumventing the force flow through the hydrodynamic component 2. It includes a first clutch component which is not illustrated herein and connected at least indirectly torque-proof, preferably directly torque-proof with the input of the torque transmission device 1 that is not illustrated and it includes at least one second clutch component 3.2 which is connected at least indirectly thus through a vibration damper 4 with the output of the torque transmission device 1. The vibration damper 4 can be provided in various configurations. It includes at least one first damper component 4.1 functioning as damper input and at least one second damper component 4.2 connected at least indirectly torque-proof with the output of the torque transmission device 1, thus coupled through a damper hub 9. The damper components 4.1 and 4.2 are arranged coaxial to one another and rotatable within limits relative to one another in circumferential direction. Depending on their configurations the damper components are coupled with one another through at least one or plural torque transmission devices 5 and/or one or plural damping coupling devices 6. In a particularly advantageous embodiment the torque transmission devices 5 and the damping coupling devices 6 are formed by the same functional components, preferably configured as spring units F1 through Fn, wherein only the spring unit Fn is illustrated herein. Thus, the particular damper components 4.1 and 4.2 can be elements of one damper stage or of different damper stages. Thus, one or plural damper stages can be arranged between the damper components, wherein the damper stages can be connected in series or in parallel. In the illustrated case only one damper component 4.1 and another damper component 4.2 are provided in an exemplary manner, wherein the damper component 4.1 forms two drive discs 7.1 and 7.2 which are arranged as lateral discs on both sides of the damper component 4.2 which is configured as a center disc 8 forming a drive flange. The center disc 8 functioning as an output flange is connected torque-proof, thus through a form lock connection configured as a welded connection with the damper hub 9.

The shiftable clutch device 3 is provided in disc configuration, preferably in a lamellar configuration. Each of the particular clutch components includes a disc support with friction surface bearing and/or friction surface forming elements arranged thereon and connected torque-proof therewith which are moveable in an axial direction. Only the lamella support 10 is illustrated herein for the second clutch component 3.2 for the torque transmission device 1. The lamella support 10 is connected torque-proof with the lateral disc functioning as a drive disc 7.1.

The hydrodynamic component 2 includes at least a bladed shell which is functioning as a pump shell and which is not illustrated herein and a bladed shell which is functioning as a turbine shell T forming an operating cavity with one another. The operating cavity is fillable with an operating means. When configured as a hydrodynamic speed-/torque converter the hydrodynamic component 2 additionally includes at least one stator shell as a reactive member which, however, is not illustrated herein either. Components of this type are used for speed- and also torque conversion. The hydrodynamic component 2 is connected at least indirectly with the output of the torque transmissions device 1 through the vibration damper 4. For this purpose the turbine shell T is connected torque-proof with the damper component 4.1 functioning as a damper input in this functional condition, thus the drive disc 7.2. The turbine shell T is attached through a turbine disc component 11 and fastening devices 12 arranged thereon, herein configured as pass through openings, and through rivets 14 at a turbine shell hub 15 and in the contact surface 16 at a damper input component, herein the drive disc 7.2, through fastening devices 17 attached thereto, herein configured as pass through openings through a torque-proof connection 18. Thus, the turbine shell hub 15 is rotatably supported about the rotation axis R at the damper hub 9. The centering of the turbine shell T is provided relative to the damper hub 9 through the turbine hub 15.

Depending on the clutch condition torque is introduced in the illustrated embodiment into the vibration damper 4 either through the damper input component 4.1 or the turbine shell T and/or through the lamella support 10 of the switchable clutch device into the drive disc 7.1.

The torque proof connection 18 between the turbine shell T and the drive disc 7.2 is configured as a welded rivet connection. This is a non-disengageable connection in which a bolt or rivet is welded with a surface on the face of a base component thus e.g. the turbine shell hub 15, and subsequently plastically deformed under form locking with the drive disc 7.2 and the turbine disc component 11. Thus, an axial force onto the entire configuration is created when producing this connection, wherein the axial force requires an opposite force. Thus, the damper hub 9 adjacent to the turbine shell hub 15 is supported in axial direction through a tool W inserted through cutouts 19 in the lateral disc 35 of a support 36 arranged adjacent to the damper hub 9. The support 36 can be provided through the lateral disc 7.1 of the damper component 4.1 or a damper component connected therewith in a multi component configuration. The cutouts 19 have to be selected in a size corresponding to the support force and they use installation space that is not useable otherwise.

BRIEF SUMMARY OF THE INVENTION

Thus, it is the object of the invention to improve a torque transfer device such that the disadvantages noted above are avoided and in particular the openings at the components adjacent to the component to be supported can be kept as small as possible. The support feature to be configured according to the invention are characterized by a low installation space requirement and are substantially independent from the size of the tool to be used.

According to the invention a torque transmission device including a hydrodynamic component, a shiftable clutch device and a vibration damper, includes the turbine shell of the hydrodynamic component being connected torque proof with a damper input component of the vibration damper and/or a turbine hub at least indirectly supported in axial direction at a damper hub. At least one axial support surface is provided at a face of a damper component adjacent in axial direction to the torque-proof connection or the damper hub. The face is oriented away in axial direction from the torque proof connection, and is characterized according to the invention in that the at least one singular support surface is arranged at a support element arranged at the damper component adjacent to the torque-proof connection in axial direction or at a support element arranged at the damper hub and forming an axial protrusion extending through damper components arranged in an adjacent manner or through portions of a support.

The particular support surface is moved through the solution according to the invention in an axial direction from the face of the damper component or the damper hub. Depending on the configuration and passage through the adjacent damper components or components of a support, even a complete displacement into a portion outside of the vibration damper can be provided. The tool that is effective at the support surface for axially supporting a component arranged adjacent to the torque-proof connection in an axial direction, in particular of the damper hub or of a component for providing the torque-proof connection between the turbine shell and the damper hub and/or the turbine shell hub, thus does not have to be run through the adjacent damper components or components of a support anymore. Only the support element bearing the support surface or forming the support surface extends at least through one, preferably also plural of the adjacent components. Thus the support element includes an axially extending pass through portion, wherein the support surface is provided at an end portion of the pass through portion. The end portion is oriented away in axial direction from the damper hub or the damper component at which the support element is arranged. Based on the association of the pass through portion with the damper hub or a damper component the support surface can vary with respect to its size from the pass through portion as a function of the configuration of the support element and the connection with the component to be supported. The cut outs in the adjacent components, in particular damper components or components of a support, can be configured smaller also when larger support surfaces are provided for passing through the support elements than for embodiments where a pass through for components of a tool is required.

Since the particular support element forms an axially extending protrusion whose cross-section surface geometry is freely selectable, this solution has the additional advantage that the support surface or the portion of the support element forming the support surfaces can be configured in a discretionary manner.

In a particularly advantageous embodiment, a plurality of support elements forming support surfaces is provided at the damper hub or at the damper component which are arranged in circumferential direction with an identical distance from one another. Thus, an even engagement of one or plural particular support elements can be achieved viewed in circumferential direction of the damper hub, the function of the support can be divided into a plurality of single locally defined small support surfaces and imbalances can be avoided.

The particular support elements can thus be arranged on a common or different arrangement diameter. Thus, they can be arranged with an offset in radial direction.

The particular support element is configured integrally in one piece with the damper hub or a damper component in a first embodiment. The support element can be formed in one process step when producing the damper hub or the damper component, for example, through forming thereon in a master forming or in a forming process. This embodiment has the advantage that the position of the support surface is safely defined by the manufacturing process as long as no position deviations caused by tolerances in the subsequent production of a connection occur.

In a second advantageous embodiment the at least one support element is configured as separate component which is permanently connected with the damper hub or a damper component at least in an axial and radial direction. The connection, for example, provided also fixated in circumferential direction when forming the support element with a circular cross-section. The advantage is in particular that the arrangement at the damper hub can be performed subsequently.

The connection between the particular support element and the damper hub or the damper component can be provided in a friction locked and/or form locked manner and/or through bonding.

In an advantageous embodiment the support element is configured with a constant cross-section surface in axial direction. In this case the size of the particular support surface corresponds to the cross-section surface over the entire extension of the support element.

In an alternative embodiment, the support element is configured in an axial direction with a cross-sectional surface variation and has a larger cross-section surface in the portion forming the support surface, than in the remaining extension. In this embodiment the pass through openings can be kept particularly small also for a larger required support surface through the adjacent damper components, which facilitates configuring the adjacent damper components particularly stable.

For example, the following elements are being used for particular support elements: pin, pinion, rivet, or bolt. Standard components can be used.

In one embodiment, devices forming at least an axial support surface are provided at the damper hub at least for an indirect support of the turbine shell hub. The devices are connected with the damper hub, a damper component and/or a turbine shell hub according to a first embodiment or are configured integrally according to a second embodiment. The devices either form a circumferentially closed circumferential support surface or plural locally defined support surfaces for the turbine shell hub.

In an advantageous embodiment, the arrangement of the devices for at least indirect support of the turbine shell hub at the damper hub is thus provided integral in one piece either at the component to be supported or at the supported component. Thus, the damper hub or a component connected therewith or the turbine shell hub. This has the advantage that the respective component can be produced in one process step.

Configuring the particular support surfaces of the devices for at least indirectly supporting the turbine shell hub at the damper hub at separate elements connected with damper components with the damper hub or the turbine shell hub, or damper components arranged there between like intermediary flange or lateral disc of a damper adapter has the advantage that standardized components are being used and the particular surfaces can be freely arranged.

In one embodiment, the devices for at least indirectly supporting the turbine shell hub at the damper hub are integrally configured in one piece with the support elements providing a functional concentration.

In one embodiment, when configuring the support elements as separate elements, the support elements can simultaneously perform the function of implementing a torque-proof connection between the damper hub and the damper component. Various functions can thus be assigned to only one functional element.

The component bearing the support element can thus be formed directly by a damper component which is connected with a damper hub or by a damper component which is free from a direct connection with a damper hub. Furthermore the component carrying the support element can be formed by the damper hub. As a function of the configuration of the vibration damper the component adjacent to the component bearing the support element can be a damper component, e.g. a damper input component, in particular a lateral disc of a damper input component, a damper output component, in particular a lateral disc of a damper output component or an intermediary flange. This yields the subsequently recited advantageous variations of the vibration damper.

A first variation is characterized in that the damper component connected with the damper hub is formed by two lateral discs. The support elements are arranged at the damper hub and configured so that they extend through the lateral discs.

A second variation is characterized in that the damper component connected with the damper hub is formed by two lateral discs arranged on both sides of an intermediary flange and the damper component axially adjacent to the torque-proof connection between the turbine shell and the vibration damper is formed by the intermediary flange. The support elements are arranged at the intermediary flange and configured so that they extend through the lateral discs.

A third variant with a configuration of the support elements at a damper component is characterized in that the damper component connected with the damper hub is formed by a flange, the support elements are arranged at the flange and arranged so that they extend through adjacently arranged lateral discs of a damper component and/or a support.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

In order to solve the problem discussed above with respect to FIG. 1, devices 20 are provided for at least indirectly reacting an opposite force when producing the weld rivet connection and thus the torque-proof connection 18. As a function of the configuration of the vibration damper 4 the devices 20 can be arranged at various components adjacent to the torque proof connection. In a first embodiment the devices can be integrally configured with the adjacent components and in a second embodiment they can be configured as separate elements. The devices 20 include at least one, preferably plural support elements 21.1-21.$n$ forming support surfaces 22.1-22.$n$ arranged in circumferential direction at the component to be supported through the opposite force, wherein the support elements are configured so that they extend through the components adjacent to the components to be supported. Thus, the particular support element 21.1-21.$n$ respectively includes a portion 26.1-26.$n$ bearing the support surface 22.1-22.$n$ and a pass through portion 27.1-27.$n$, wherein both can be characterized by an identical geometry and dimensions or by a different geometry and/or dimensions in extension direction. Thus, the support surface 22.1-22.$n$ is respectively arranged in the end portion of the support elements 21.1-21.$n$ that is oriented away from the component to be supported.

The component to be supported by the opposite force in a first variant according to FIGS. 2-7 is the damper hub 9. FIG. 8 illustrates an alternative variant wherein the component to be supported by the opposite force is provided as a damper component, for example, an intermediary flange. All embodiments illustrate e.g. the support element 21.$n$ forming the support surface 22.$n$. The hatchings that are typical for cross sectional views were omitted for reasons of clarity.

FIGS. 2-7 thus illustrate a detail of an axial sectional view of an embodiment of a device 4 with an intermediary flange 23 which can be used e.g. in series dampers. The remaining basic configuration of a torque transmission device 1 corresponds to the configuration described in FIG. 1. Therefore, like reference numerals are used for like elements. In this axial sectional view the essential damper components are:

The damper component 4.1 functioning as a damper input component, for example, the drive discs 7.1, 7.2 configured as lateral discs, an intermediary flange 23 coupled with the drive discs through first torque transmission devices and/or damping coupling devices, for example, spring units which are not illustrated, and the damper component 4.2 coupled with the intermediary flange 23 through second torque trans devices and/or damping coupling devices, for example, spring units Fn. The damper component 4.2 functions as a damper output component during normal operations. The damper component 4.2 is formed herein by two lateral discs 24.1, 24.2 arranged on both sides of the intermediary flange in axial direction. The lateral discs 24.1, 24.2 are connected torque proof with the damper hub 9. The connection can be provided in a friction locked, form locked, or bonded manner.

Fastening devices 17 configured as pass through openings are provided for the rivet 14 required for forming the torque connection 18 at the lateral disc 7.2 of the first damper component 4.1. The turbine shell hub 15 is supported at the damper hub 9. The turbine shell T is not illustrated. The turbine shell T is connected torque proof through hot riveting forming a welded rivet joint with the turbine shell hub 15 and the damper component 4.1, in particular the drive disc 7.2 according to the descriptions provided with reference to FIG. 1.

Figure 2:
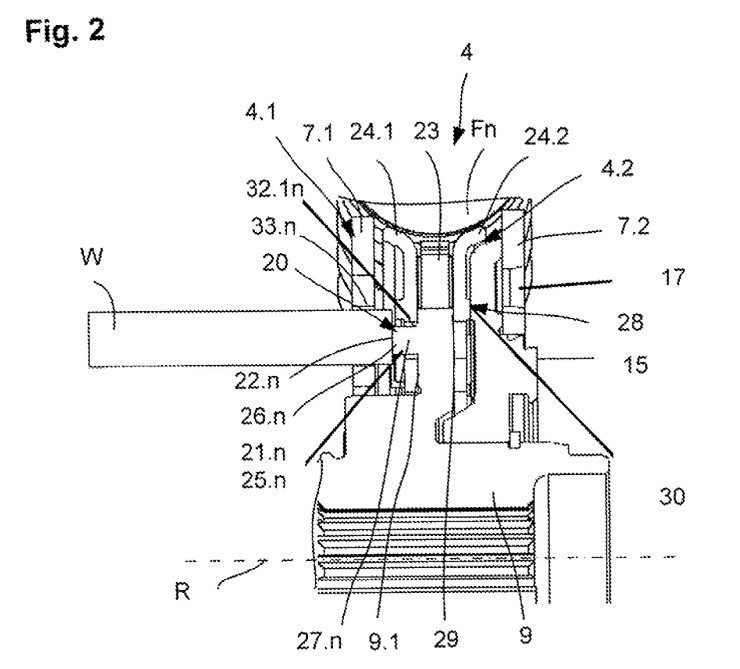
FIG. 2 illustrates a first embodiment and arrangement of support elements at a damper hub forming support surfaces in a detail of a sectional view of a torque transmission device in an exemplary manner.
Figure 3:
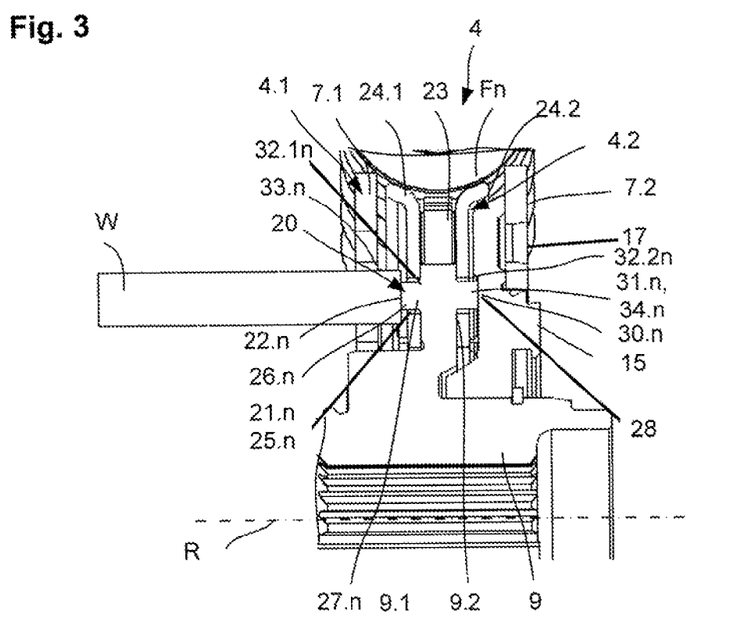
FIG. 3 illustrates an advantageous improvement of an embodiment according to FIG. 2.

In a first embodiment according to FIGS. 2 and 3, devices 20 are configured integral in one piece with the component to be supported. The component to be supported is a damper hub 9. This arrangement of the particular support elements 21.1-21.$n$. Only 21.1 is illustrated in circumferential direction preferably with even spacing from one another in order to prevent imbalances. The arrangement of the support elements is illustrated on a common arrangement diameter. However, also an arrangement with an offset in radial direction and in circumferential direction from one another is feasible which, however, is not illustrated.

The arrangement for the support elements 21.1-21.$n$ at the damper hub 9 is provided at the face 9.1 oriented away from the welded rivet joint and thus the torque proof connection 18. The embodiment according to FIG. 2 illustrates an integral configuration of the devices 20, for example, support elements 21.1-21.$n$ with the damper hub 9. The particular support element 21.$n$ forms an axially oriented protrusion, in particular a so called pin 25$n$ which is configured so that it extends in axial direction at least through an adjacent component, for example, a damper component, thus the lateral disc 24.1 of the damper component 4.2. Thus, respective pass through openings 32.1$n$ are provided at the lateral disc 24.1. The pass through openings 32.1 are sized so that they only have to receive the pins 25.1-25.$n$ since no relative movement is provided in circumferential direction between the lateral disc 24.1 and the damper hub 9 due to the torque proof connection of the lateral disc 24.1 to the damper hub 9. When passing through the drive discs 7.1 the particular pass through opening 33.1-33.$n$ that is associated with a particular support element 21.1.-21.$n$ is configured as a circumferentially oriented slotted hole. The extension in circumferential direction is adjusted to the maximum permissible rotation angle between the damper hub 9 and the drive disc 7.1.

The geometry, for example, of the cross sectional surface and the dimensions of the particular pins 25.1-25.$n$ is selected so that their cross sectional surfaces are smaller respectively than the loading surfaces of a tool that become effective at the cross sectional surfaces for support and introducing an opposite force. The support surface 22.$n$ provided at a single pin 25.$n$ can furthermore be eccentrically disposed relative to a loading surface provided at an associated bolt of the tool W. Through the particular pins 25.1-25.$n$ the support for the torque proof connection 18 is provided in the form of a welded rivet connection during final assembly of the turbine shell T.

FIG. 1 furthermore illustrates devices 28 for at least indirect support of the turbine shell hub 15 at the damper hub 9. These devices are configured in the illustrated embodiment at a separate component configured as lateral disc 24.2 of the damper component 4.2 which includes support surfaces 29 that are oriented in axial direction to the damper hub 9 and support surfaces 30 that are oriented in axial direction to the turbine shell hub 15. The devices 28 can thus be configured as respective support surfaces 29, 30 that are circumferentially closed in circumferential direction or as a plurality of partial surfaces forming the support surfaces 29 and/or 30, wherein the partial surfaces are particular surfaces that are offset from one another.

FIG. 3 illustrated a particularly advantageous embodiment with an integral configuration of the devices 20 and of the devices 28 of the turbine shell hub 15 at the damper hub 9 with the damper hub 9. The devices 20 are configured analogous to the embodiment in FIG. 2. Therefore reference is made to FIG. 2 with this respect. The devices 28 include support elements 31.1-31.$n$ forming particular support surfaces 30.1-30.$n$. The support elements 31.1-31.$n$ are arranged in axial direction forming a protrusion at the face of the damper hub 9 oriented towards the torque proof connection 18. Also here the arrangement can be provided with even distances from one another in circumferential direction with or without a radial offset and on one or plural arrangement diameters. In the illustrated case, the configurations of the support elements 21.1-21.$n$ and 31.1-31.$n$ are matched with respect to geometry and arrangement and the arrangement of both of them is performed in axial direction so that they are aligned with one another.

Figure 4:
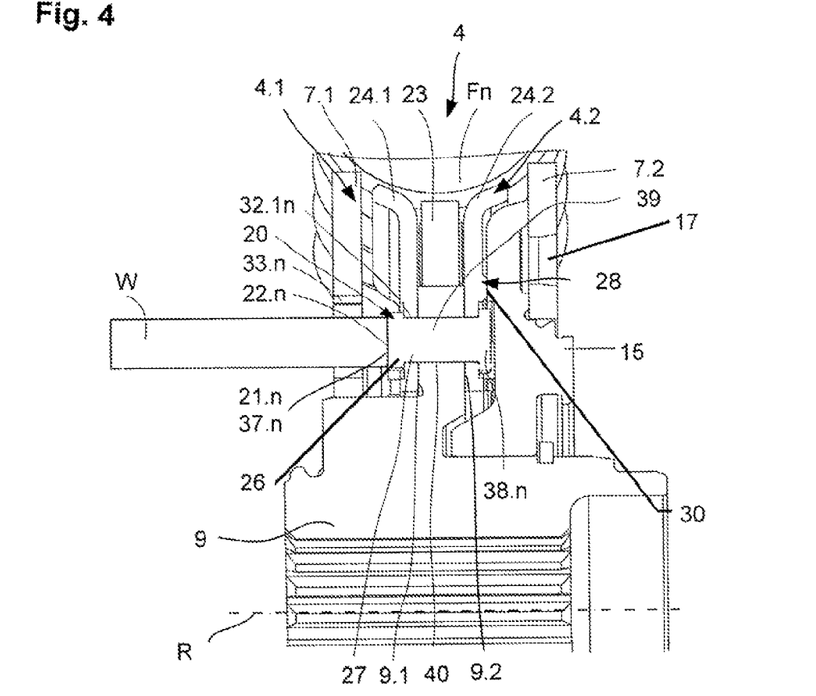
FIG. 4 illustrates a second configuration and arrangement of support surface forming support elements at the damper hub according to the invention in a detail of a sectional view of a torque transmission device.

In another embodiment according to FIG. 4, the devices 20 are formed by separate elements. This applies analogous for the devices 28 for at least indirectly supporting the turbine shell 15 at the damper hub 9. Thus, the devices 20 are formed in a particularly advantageous embodiment in a functional concentration with the devices 39 for implementing a torque proof connection between the damper hub 9 and the lateral discs 24.1, 24.2. The devices include rivets 37.1-37.$n$ and 38.1-38.$n$ for connecting the respective lateral discs 24.1 and 24.2 with the damper hub 9. In a particularly advantageous embodiment, the rivets 37.1-37.$n$ and 38.1-38.$n$ are respectively formed by a double rivet element passing through the pass through openings 32.11-32.1$n$, 32.21-32.2$n$ at the lateral discs 24.1, 24.2 and 40 at the damper hub 9. The non disengageable connection 39 thus configured is based on form locking Thus, a plurality of rivet elements of this type is provided. They extend through the damper hub 9 and through the adjacent component arranged on the tool side.

The support surfaces 22.1-22.$n$ are formed by the rivet heads of the rivets 37.1-37.$n$. These rivet heads define the portion 26.1-26.$n$ of the support elements 21.1-21.$n$ bearing support surfaces 22.2-22.$n$. The rivets 37.1-37.$n$ extend in axial direction respectively through the pass though openings 32.11-32.1$n$ at the lateral disc 24.1.

The rivets 38.1-38.$n$ are only used for implementing the torque proof connection 39. The devices 28 are configured analogously to FIG. 2 in FIG. 4 at the lateral disc 24.2 which includes the axial contact and support surfaces 29, 30 towards the damper hub 9 and towards the toward turbine shell hub 15. Thus, the particular support surfaces 29, 30 can also be advantageously configured as circumferentially closed surfaces. Also a configuration with partial surfaces that are configured offset from one another is feasible.

Figure 5:
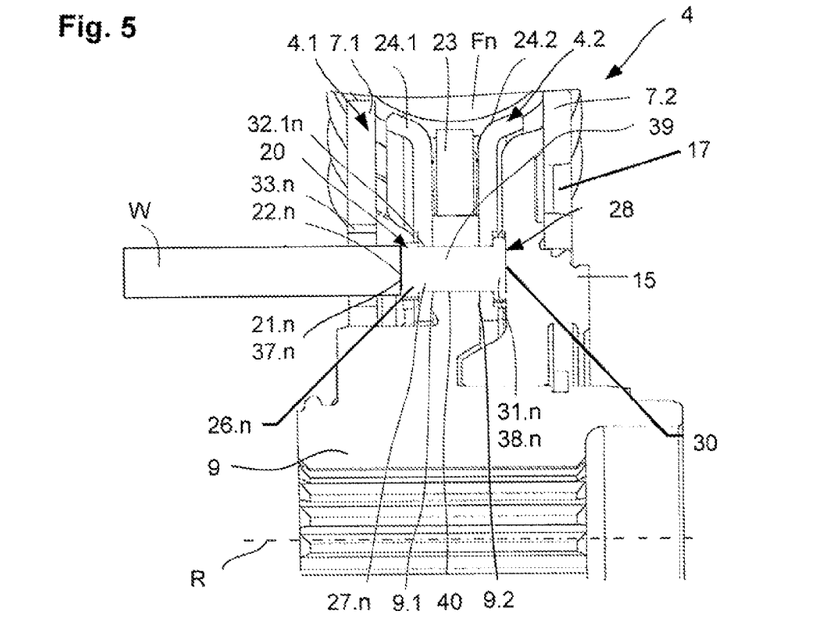
FIG. 5 illustrates an improved embodiment according to FIG. 4.

In FIG. 5, devices 20, 28 and 39 are advantageously combined in a functional concentration. The double rivet elements forming the rivets 37.1-37.$n$ and 38.1-38.$n$ for assuring the torque proof connection 39 are respectively formed by the support elements 22.1-22.$n$ forming the support surfaces 21.1-22.$n$ and the support elements 31.1-31.$n$ forming the support surfaces 30.1-30.$n$. This means the rivet heads respectively form the support surfaces 22.1-22.$n$, 30.1-30.$n$ respectively. Due to the torque proof connection with the damper hub 9 a support of the turbine hub 15 is directly provided through the rivets 38.1-38.$n$ at the damper hub 9 and of the tool at the support surfaces 22.2-22.$n$ of the damper hub 9.

Figure 6:
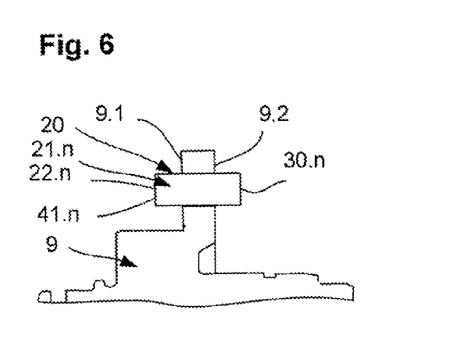
FIG. 6 illustrates and optional configuration of support elements forming separate support surfaces with reference to a detail of a damper hub.
Figure 7:
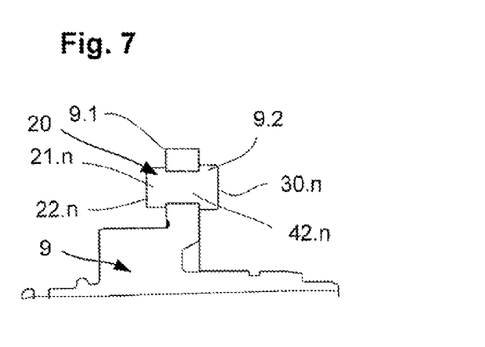
FIG. 7 illustrates another embodiment of support elements forming separate support surfaces with reference to a detail of a damper hub.
Figure 8:
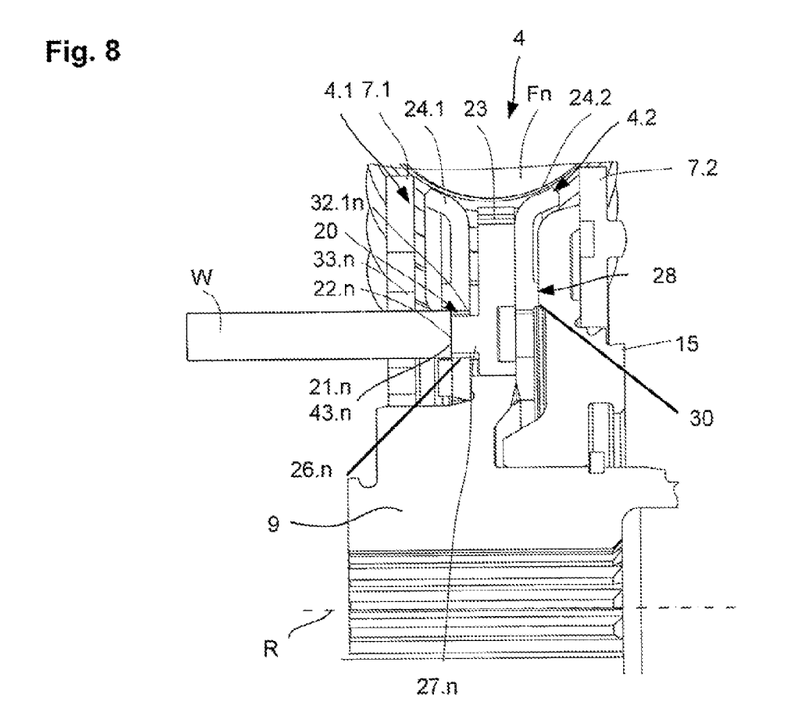
FIG. 8 illustrates a first embodiment and arrangement according to the invention of support elements forming support surfaces at a damper component configured as an intermediary flange in an exemplary manner in a detail of an axial sectional view of a torque transmission device.

FIGS. 6 and 7 illustrate the configuration of the support elements 21.1-21.$n$ arranged at the damper hub 9 and extending in axial direction through adjacent components and configured as separate components, thus the support element 21.$n$ in an exemplary manner for the damper hub 9.

FIG. 6 illustrates the configuration of the pins 25.1-25.$n$ which are provided integral with the damper hub in the form of additionally pins 41.$n$ as illustrated in FIG. 2. They are configured as separate components extending through the damper hub 9 forming at least the support surface 22.$n$ for tool side support and in a particular advantageous embodiment also the support surface 30.$n$ for supporting the turbine shell hub 15. The particular pins 41.$n$ can be connected in a friction locking- or form locking- or bonded manner with the damper hub 9 configuring protrusions extending in axial direction and forming support surfaces 22.$n$, 30.$n$. The configuration of the pins 41.$n$ is provided herein with a constant cross section over the entire extension, this means without surface area changes.

FIG. 7 illustrates an improvement according to FIG. 6 in which the configuration is provided with additional rivet elements 42.1-42.$n$ without an actual riveting function with other components instead of the configuration being provided with pins. The at least one particular rivet element 42.$n$ is only used for configuring at least the support surfaces 22.1-22.$n$, preferably also the support surfaces 30.1-30.$n$ and it is characterized by different cross sectional surfaces in its axial extension.

For both embodiments the particular pin 41.$n$ or the rivet element 42.$n$, besides taking over the functions of the devices 20, can also take over the function of the devices 28 for at least indirectly supporting the turbine shell 15 at the damper hub 9.

FIG. 8 illustrates an alternative arrangement of the support elements 21.1-21.$n$ bearing support surfaces 22.1-22.$n$ of the devices 20 at a damper component configured as an intermediary flange 23 in an exemplary manner. Also here the damper component 4.2 is connected toque proof with the damper hub 9. Thus, the damper component 4.2 thus includes the lateral discs 24.1, 24.2 which are arranged on both sides of the intermediary flange 23. The configuration of the support elements 21.1-21.$n$ is provided integral with the intermediary flange 23. The support elements 21.1-21.$n$ are configured so that they extend through pass through openings 32.11-32.1$n$ at the lateral disc 24.1. Based on a limited rotatability of the damper hub 9, and thus the damper component 4.2 connected therewith, relative to the intermediary flange 23, the pass through openings, however, are configured extending in circumferential direction so that they leave the permissible rotation angle open. The support elements 21.$n$ are configured in an exemplary manner as pins 43.1-43$n$.

The configuration of the devices 28 for supporting the turbine shell hub 15 at the damper hub 9 is provided directly at the damper component 4.2, for example, at the lateral discs 24.2.

The configuration of the support elements 21.$n$ at the intermediary flange 23 is provided in an exemplary manner. Also here there is the option to use separate elements forming protrusions in axial direction like pins, bolts or pinions which are connected to the intermediary flange 23 preferably connected torque proof. With this respect the same statements apply as for the support elements 21.1-21.$n$ in the FIGS. 2-7. Furthermore, also here there is the option that is not illustrated of attaching or integrally configuring the devices 28 with the intermediary flange 23 and configuring the support elements 21.1-21.$n$ integral with the devices 28 for at least indirectly supporting the turbine shell hub 15 at the damper hub 9.

As a matter of principle, the support elements of the devices 20 and/or 28 are configured extending in axial direction and offset from one another in circumferential direction. The particular axial protrusions associated with the respective devices 20 or 28 can thus be arranged at the different faces 9.1 and 9.2 of the damper hub 9 or of a damper component, e.g.

the damper component 4.2 or an intermediary flange 23 so they are in alignment or include an offset in circumferential direction.

The particular devices 20 and/or 28 can be integrally configured with the arrangement component or they can also be configured as separate elements to be connected to the arrangement component.

The configuration with separate elements can be provided e.g. in the form of pins, bolts, pinions or rivets. The connection with the arrangement component can be provided in a friction locked-, form locked-, or bonded manner.

The cross sectional surfaces of the support elements can be varied over the extension of the support element or can be kept constant.

A functional concentration can be provided in an advantageous embodiment through association or combination of the functions of the devices 20 and 28. In an advantageous embodiment, the function of implementing a torque proof connection between the components can be additionally or optionally provided through the devices 20.

REFERENCE NUMERALS AND DESIGNATIONS 1 torque transmission device
2 hydrodynamic component
3 shiftable clutch device
3.2 clutch component
4 vibration damper
4.1 first damper component
4.2 second damper component
5 torque transmission device
6 damping coupling device
7.1 drive disc
7.2 drive disc
8 center disc
9 damper hub
9.1 face of damper hub
9.2 face of damper hub
10 lamella support
11 turbine disc component
12 fastener
14 rivet
15 turbine shell hub
16 contact surface
17 fastener
18 torque proof connection
19 cut outs
20 device for at least indirectly supporting a counter force to be applied on the tool side
21.1-21.n support element
22.1-22.n support surface
23 intermediary flange
24.1, 24.2 lateral disc
25.1-25.n pin
26 portion at support element forming support surface
27.1-27.n pass through portion of support element
28.1-28.n devices for at least indirect support between turbine shell hub and damper hub
29 support surface of the devices 28
30 support surface of the devices 28
31.1-31.n support element
32.11-32.1n pass through opening
33.11-33.n pass through opening
35 lateral disc
36 support
37.1-37.n rivet
38.1-38.n rivet
39 devices for torque proof connection
40 pass through opening
41.1-41.n pin
42.1-42.n rivet element
43.1-43.n pin
R rotation axis
T turbine shell
W tool

What we claim is:

1. A torque transmission device (1), comprising a rotation axis, a hydrodynamic component (2), a shiftable clutch device (3) and a vibration damper (4), wherein:
   the vibration damper includes:
      a damper input component (4.1) including:
         a first drive disc (7.1) non-rotatably connected to the shiftable clutch device; and,
         a second drive disc (7.2) non-rotatably connected to the first drive disc;
      a first lateral disc (24.1) forming at least a portion of an output of the vibration damper; and,
      a damper hub (9) non-rotatably connected to the first lateral disc, the damper hub:
         forming an output of the torque transmission device (1); and,
         including:
            at least one first axial support surface (22.1-22.n) orthogonal to the rotation axis; and,
            a support surface (22.1-22.n):
               forming an axial protrusion:
                  extending through the first lateral disc;
                  aligned, in an axial direction, parallel to the rotation axis, with an opening in the first drive disc; and,
                  offset, in the axial direction, from the opening;
   a turbine shell (T) of the hydrodynamic component (2) is non-rotatably connected with the damper input component (4.1) with a torque-proof connection (18);
   the at least one first axial support surface (22.1-22.n) is oriented away, in the axial direction, from the torque-proof connection (18); and,
   the damper input component is at least indirectly supported in an axial direction, parallel to the rotation axis, at the damper hub (9) through the torque-proof connection (18).

2. The torque transmission device (1) according to claim 1, wherein the damper hub is configured with a variable cross sectional surface in the axial direction and includes a larger cross sectional surface in the portion (26.n) forming the support surface (22.1-22.n), than in a pass through portion (27.n).

3. The torque transmission device (1) according to claim 1, further comprising: a second lateral disc (24.2) and a turbine hub (15), wherein the first lateral disc (24.1) is connected torque proof with the damper hub (9); and the torque transmission device (1) further comprises a device (28) forming at least one second axial support surface (29, 30, 30.1-30.n) for at least indirectly supporting the turbine shell hub (15) at the damper hub (9), wherein the devices (28) is connected with the damper hub (9), the second lateral disc (24.2), or integrally configured therewith.

4. The torque transmission device (1) according to claim 3, wherein the device (28) for at least indirectly supporting the turbine shell hub (15) at the damper hub (9) is integrally configured with the damper component (23) adjacent to the torque proof connection (18) in the axial direction or integrally configured with a support element (21.1-21.n) arranged at the damper hub (9).

5. The torque transmission device (1) according to claim 1, wherein the vibration damper includes a second lateral disc (24.2) forming at least a portion of the output of the vibration damper, and the damper hub (9) is configured to extend through the first and second lateral discs (24.1, 24.2).

6. The torque transmission device (1) according to claim 1, wherein:
   the vibration damper includes:
      an intermediary flange (23); and,
      a second lateral disc (24.2) forming at least a portion of the output of the vibration damper;
   the first and second lateral discs are arranged on both sides of the intermediary flange (23);
   the intermediary flange (23) is adjacent, in the axial direction, to the torque proof connection (18) and is located, in the axial direction, between the turbine shell (T) and the vibration damper (4); and
   the damper hub is arranged at the intermediary flange (23) and is configured to extend through the first and second lateral discs.

7. The torque transmission device (1) according to claim 1, wherein:
   the vibration damper includes:
      an intermediary flange (23); and,
      a second lateral disc (24.2) forming at least a portion of the output of the vibration damper; and
   the damper hub is arranged at the intermediary flange and configured to extend through the first and second lateral discs.

\* \* \* \* \*